United States Patent [19]

Burger et al.

[11] Patent Number: 4,775,083
[45] Date of Patent: Oct. 4, 1988

[54] PORTABLE RADIO CARRYING CASE

[75] Inventors: Marilyn S. Burger, Pompano Beach; Eugene R. Fay, Boca Raton; Farid Cifuentes, Orlando, all of Fla.

[73] Assignee: Motorola, Inc., Schaumburg, Ill.

[21] Appl. No.: 9,855

[22] Filed: Feb. 2, 1987

[51] Int. Cl.⁴ .............................................. A45F 5/00
[52] U.S. Cl. .............................. 224/253; 224/240; 455/351
[58] Field of Search ............... 224/235, 236, 240, 241, 224/253, 902, 904, 908, 920, 267, 222, 914; 150/52 R, 52 J; 206/305; 455/351, 100, 344, 350

[56] References Cited

U.S. PATENT DOCUMENTS

| | | |
|---|---|---|
| 3,081,807 | 3/1963 | Lightburn ........................ 150/52 R |
| 3,244,981 | 4/1966 | Der Tatevasian ................ 455/351 |
| 3,249,873 | 5/1966 | Whittenmore, Jr. et al. ...... 455/351 |
| 3,748,583 | 7/1973 | Andersen et al. ................ 455/351 |
| 3,805,915 | 4/1974 | Payne ............................. 455/351 |
| 4,135,653 | 1/1979 | Sieloff ............................. 224/222 |
| 4,299,344 | 11/1981 | Yamashita et al. ............... 224/242 |
| 4,525,872 | 6/1985 | Zochowski ....................... 455/344 |
| 4,573,573 | 3/1986 | Favaro ........................... 150/52 R X |

Primary Examiner—Henry J. Recla
Assistant Examiner—David Voorhees
Attorney, Agent, or Firm—Winfield J. Brown, Jr.; Joseph T. Downey; Anthony J. Sarli, Jr.

[57] ABSTRACT

A carrying case for a portable radio is provided which includes an attachment structure for attaching the case to the radio user. The carrying case includes a two position sound deflector which, at the option of the user, is situated in a first position to deflect sound upward toward the user's ears or which is situated in a second position for protecting the controls of the radio from the environment.

3 Claims, 6 Drawing Sheets

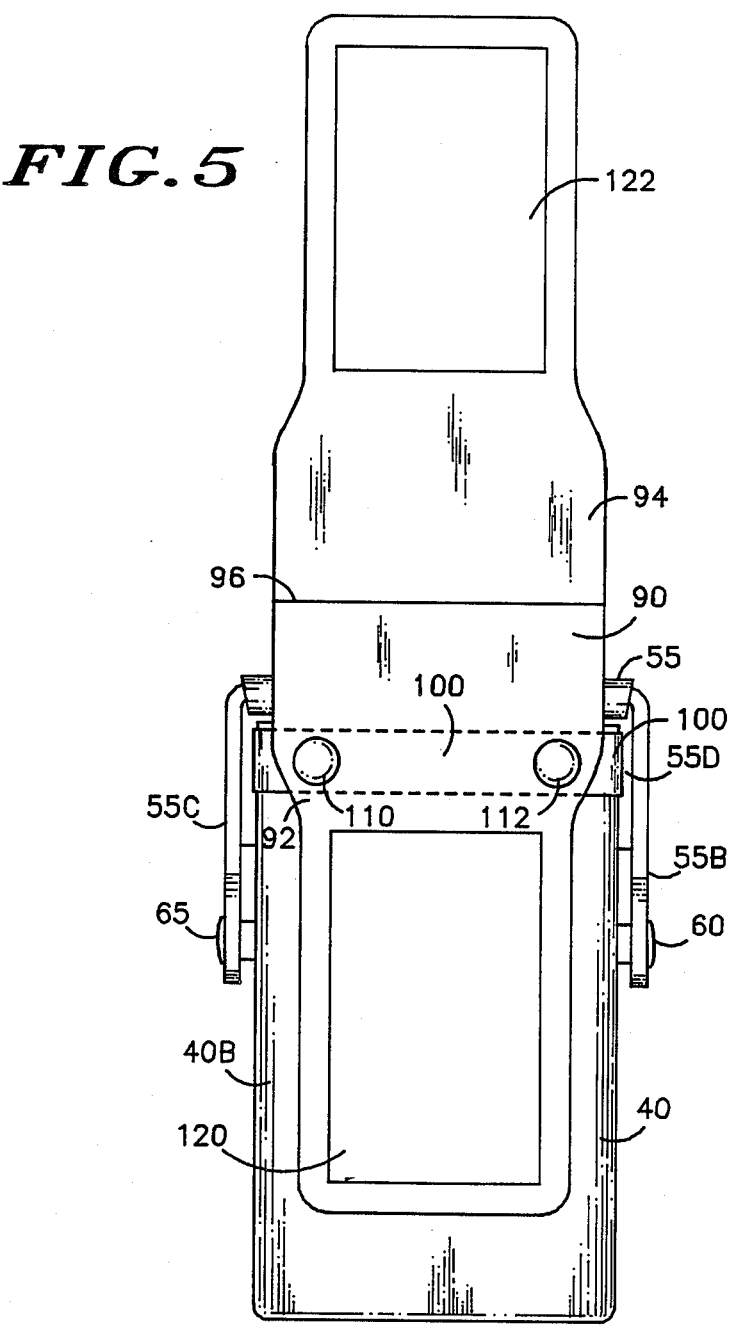

PORTABLE RADIO CARRYING CASE

BACKGROUND OF THE INVENTION

This invention relates generally to carrying cases for portable electronic devices which generate audio signals. More particularly, the invention relates to carrying cases for portable radio devices.

Conventional carrying cases for portable radio devices are generally formed by an enclosure having an opening through which the radio's audio or sound signal emanates. Generally this opening is formed by locating a plurality of sound channeling holes or slots in the case to permit the sound signal to pass from the radio through the case so that it can be heard by the radio user. Unfortunately, this approach results in the attenuation of the sound signal to some extent as it passes through the plurality of holes to the external environment.

Portable radios are generally worn on the lower part of the user's body, for example on the user's belt. The speaker of the radio is usually located such that when the radio is worn on the user's belt, the sound signal is projected outward and away from the body and the user's ear. The typical conventional carrying case positions the aforementioned plurality of sound channeling holes such that the radio's sound signal continues to be directed outward and away from the radio user's ear.

Those skilled in the carrying case art appreciate that one purpose of radio carrying cases is to protect the radio from the environment. Unfortunately, conventional carrying cases have tended to be so bulky and cumbersome as to hinder the user's access of radio controls which are generally located in the upper portions of such radios.

BRIEF SUMMARY OF THE INVENTION

One object of the present invention is to provide a carrying case for a portable radio which permits easy access to radio controls.

Another object of the present invention is to provide a carrying case for a portable radio which permits the user, at his or her option, to channel the sound from the radio upward toward the user's ears for enhanced listening.

Yet another object of the invention is to provide a portable radio carrying case which protects the radio from the environment.

A further object of the present invention is to provide a portable radio carrying case which permits the radio to be attached temporarily to be attached to the user for carrying purposes.

In one embodiment of the invention, a carrying case for a portable radio is provided which includes a housing member for housing such radio. The housing member exhibits a shape which conforms generally to the shape of the radio. The housing member includes a first surface having a first opening for receiving the radio therethrough. The housing further includes a second opening on a second surface substantially perpendicular to the first surface, such second opening being for passing sound signals from the radio therethrough. A deflector member is attached to the housing and is operative in a first mode for covering the first opening. The deflector member is operative in a second mode for uncovering the first opening and simultaneously deflecting the sound signal passing through the second opening to a direction substantially parallel with the second surface and toward the first surface. The carrying case further includes an attachment member, connected to said housing means, for attaching the case to a radio user.

The features of the invention believed to be novel are specifically set forth in the appended claims. However, the invention itself, both as to its structure and method of operation, may best be understood by referring to the following description and the accompanying drawings.

BRIEF DESCRIPTION OF THE DRAWINGS

FIG. 5 is a view of the back of the carrying case of FIG. 1.

DETAILED DESCRIPTION OF THE INVENTION

Figure 1:
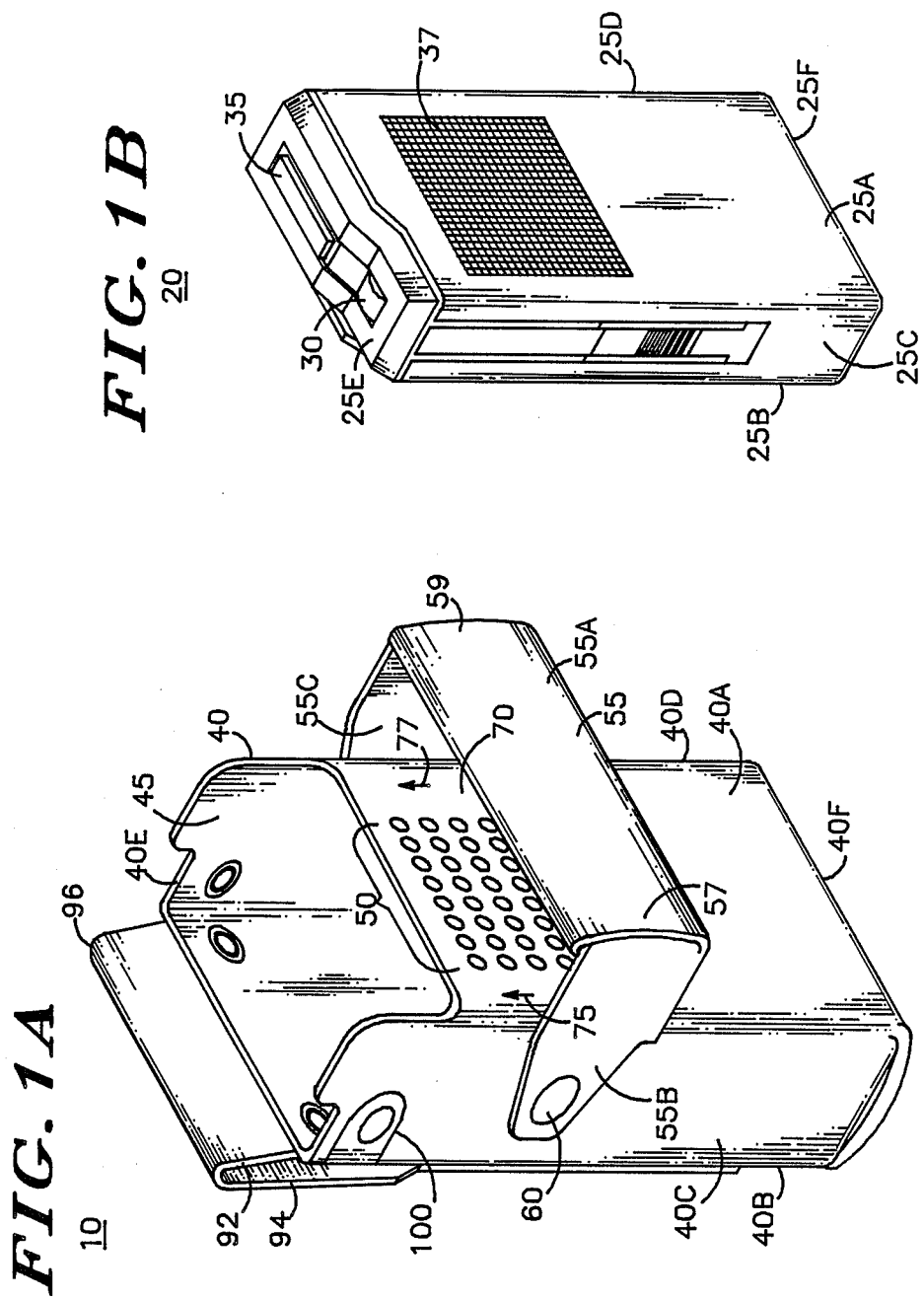
FIG. 1A is a perspective view of the carrying case of the present invention in the open position.
FIG. 1B is a perspective view of one portable radio which may be situated in the carrying case of FIG. 1A.

FIG. 1A shows one embodiment of the carrying case of the invention as carrying case 10. Case 10 is appropriately dimensioned to receive a portable radio, such as the paging receiver 20 of FIG. 1B, therein. In this example, paging receiver 20 exhibits a generally rectangular geometry and includes front and back surfaces, 25A and 25B respectively, side surfaces 25C and 25D, and top and bottom surfaces 25E and 25F, respectively. Paging receiver controls 30 and 35 are situated on top surface 25E. Receiver 20 includes a sound projecting surface 37 from which sound signals are projected to the receiver user. Those skilled in the art will appreciate that carrying case 10 is easily adapted to accommodate two way radios in addition to the paging receivers which are shown by way of example herein.

Figure 2:
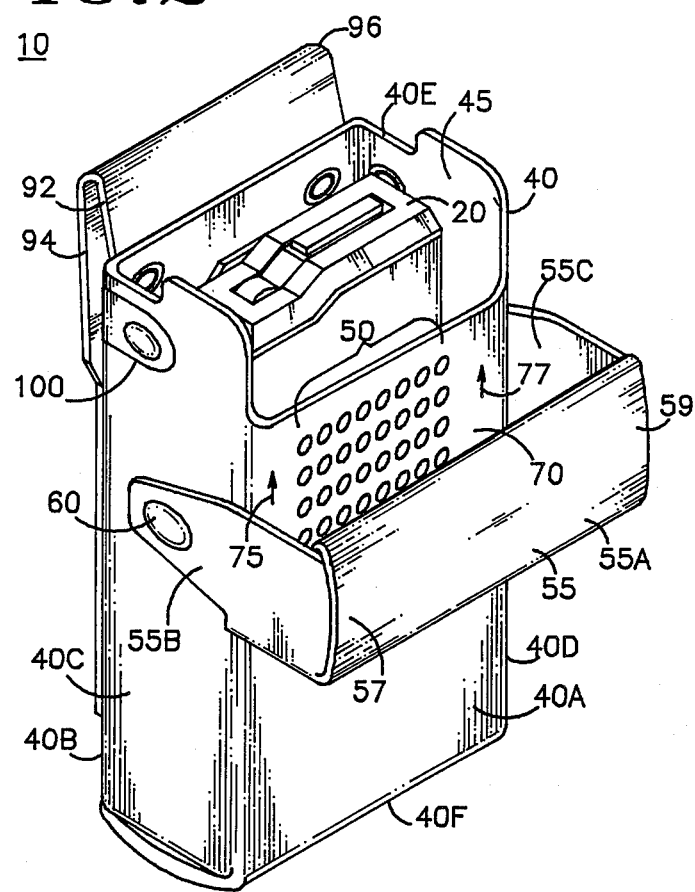
FIG. 2 is a perspective view of the carrying case of FIG. 1A including the portable radio of FIG. 1B situated therein.

Carrying case 10 includes a housing 40 which is generally rectangularly shaped to accommodate the rectangular geometry of paging receiver 20 therein. More specifically, housing 40 includes a front surface 40A, a back surface 40B, side surfaces 40C and 40D, a top surface 40E and a bottom surface 40F. In one embodiment of the invention, housing 40 is fabricated from a strong, durable, flexible material such as leather, heavy canvass, synthetic leather, vinyl or plastic and like materials, for example. Top surface 40E includes an opening 45 through which paging receiver 20 is inserted when being slid into housing 40. Opening 45 provides the pager receiver user with access to controls 30 and 35 of receiver 20 when receiver 20 is situated in carrying case 10 as shown in FIG. 2.

Returning to FIG. 1A, carrying case 10 includes a plurality of openings 50 through which sound signals from sound projecting surface 37 are projected when paging receiver 20 is situated in case 10. When paging receiver 20 is so situated, openings 50 are substantially aligned with sound projecting surface 37.

Figure 3:
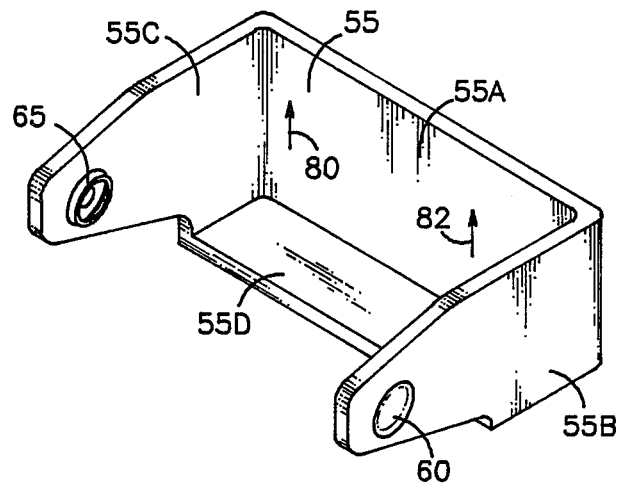
FIG. 3 is a perspective view of the sound deflector portion and control cover of the carrying case of FIG. 1A.

Carrying case 10 further includes a moveable acoustic deflector or baffle 55 which is pivotally mounted to housing 40 as shown in FIG. 1A. Deflector 55 is conveniently fabricated from the same material as housing 40, or a similar material. Deflector 55 includes a front surface 55A which is substantially parallel to the front surface 40A of housing 40 when deflector 55 is in the open position shown in FIG. 1A. Front surface 55A includes opposed ends 57 and 59 which are connected to pivots 60 and 65, respectively, by side surfaces 55B and 55C as shown in FIG. 1A. Deflector 55 includes a bottom surface 55 which is more clearly shown in FIG. 3. For convenience, in FIG. 3, deflector 55 is shown detached from housing 40.

When paging receiver 20 is situated in carrying case 10, sound signals from receiver 20 flow through openings 50 and enter the cavity 70 bounded by housing surface 40A, deflector front surface 55A and deflector side surfaces 55B and 55C. These sound signals are deflected approximately 90 degrees so as to travel upward substantially parallel with housing surface 40A and toward housing top surface 40E and opening 45. Such sound signals are thus deflected and caused to travel in a direction generally indicated by arrows 75 and 77 of FIG. 1A and arrows 80 and 82 of FIG. 3. Since carrying case 10 is intended to be mounted on the user below the user's ear level, this upward deflection of the receiver sound signals results in a greater sound intensity actually reaching the user's ear than would occur if the carrying case of the invention were not used.

Figure 4:
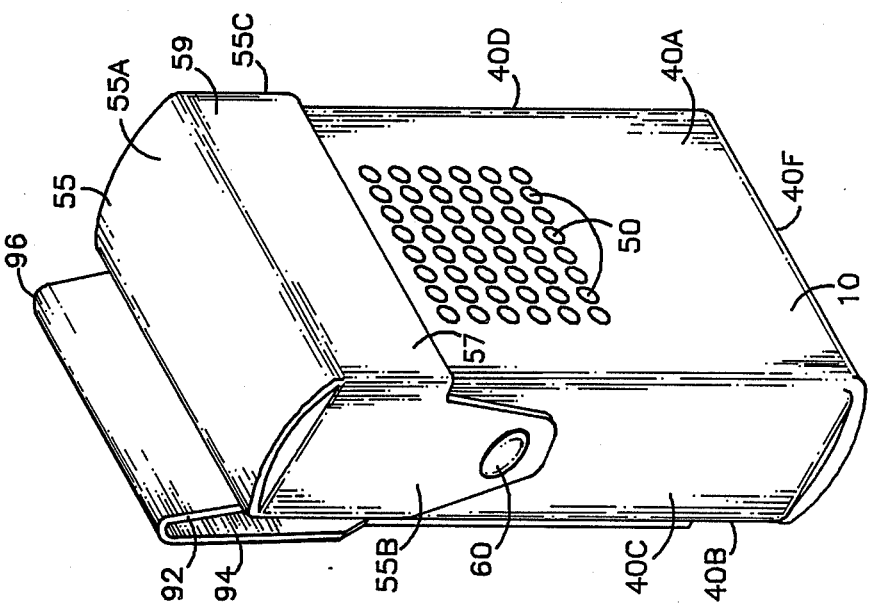
FIG. 4 is a perspective view of the carrying case of FIG. 1 shown in the closed position.

FIG. 4 shows carrying case 10 with deflector 55 in the closed position, that is, with deflector 55 rotated upward about pivots 60 and 65 such that deflector 55 covers receiver controls 30 and 35. Thus at the user's option, deflector 55 is placed in a first position (deflector down) to permit more audio to reach the user's ear or is rotated upward to a second position (deflector up) to protect the controls and upper portion of receiver 20.

Carrying case 10 includes an attachment mechanism which permits the user to attach carrying case 10 to the user's belt or similar article. In the particular embodiment of the ivention shown in FIGS. 1-4 and more clearly in the back view of carrying case 10 of FIG. 5, the attachment mechanism includes a flap 90 of material similar to the material employed to fabricate housing 40. In FIG. 5, deflector 55 is shown in the up position. Flap 90 exhibits a lengthwise dimension approximately twice as long as the height of carrying case 10. Flap 90 is divided into a lower portion 92 and an upper portion 94 by a fold line 96 which is approximately in the center of flap 90 as shown in FIG. 5.

Figure 6:
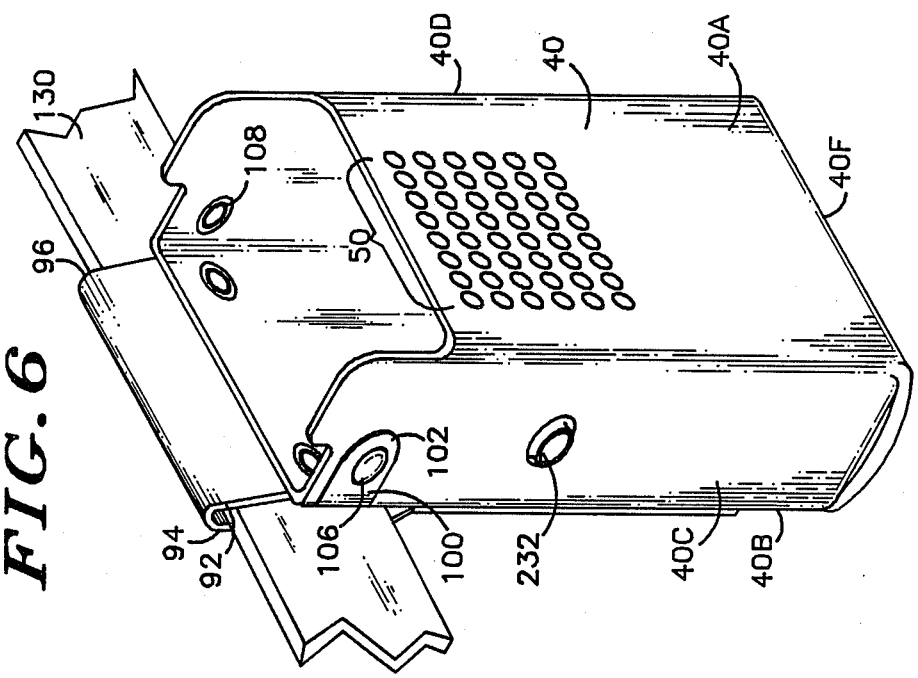
FIG. 6 is a perspective view of the carrying case of FIG. 1A mounted on the user's belt and shown with the sound deflector detached.

As seen in FIG. 5 and more clearly in FIG. 6, carrying case 10 includes a substantially U-shaped metal brace member 100 which is situated adjacent and in contact with the uppermost portion of housing back surface 40B. Brace member 100 includes arms 102 and 104 which are held to housing surfaces 40C and 40D, respectively, by rivets 106 and 108.

Returning again to FIG. 5, flap lower portion 92 is held to housing back surface 40B by stitching (not shown) and by rivets 110 and 112 which pass through lower flap portion 92, brace member 100 and housing 40. A member 120 of hook and loop fastener material is situated on flap lower portion 92 as shown. A corresponding mating member 122 of hook and loop fastener material is situated on flap upper portion 94 at a location selected such that member 122 aligns and attaches to member 120 when flap upper portion 94 is folded about center line 96 and over flap lower portion 92. By folding flap upper portion 94 over a belt 130, or similar article as shown in FIG. 6, and by attaching flap upper portion 94 to flap lower portion 92 as outlined above, carrying case 10 is held to belt 130. Those skilled in the carrying case art appreciate that other means of attaching the carrying case to the user may be employed. For example a belt clip may be used to attach the case to the user.

Figure 7:
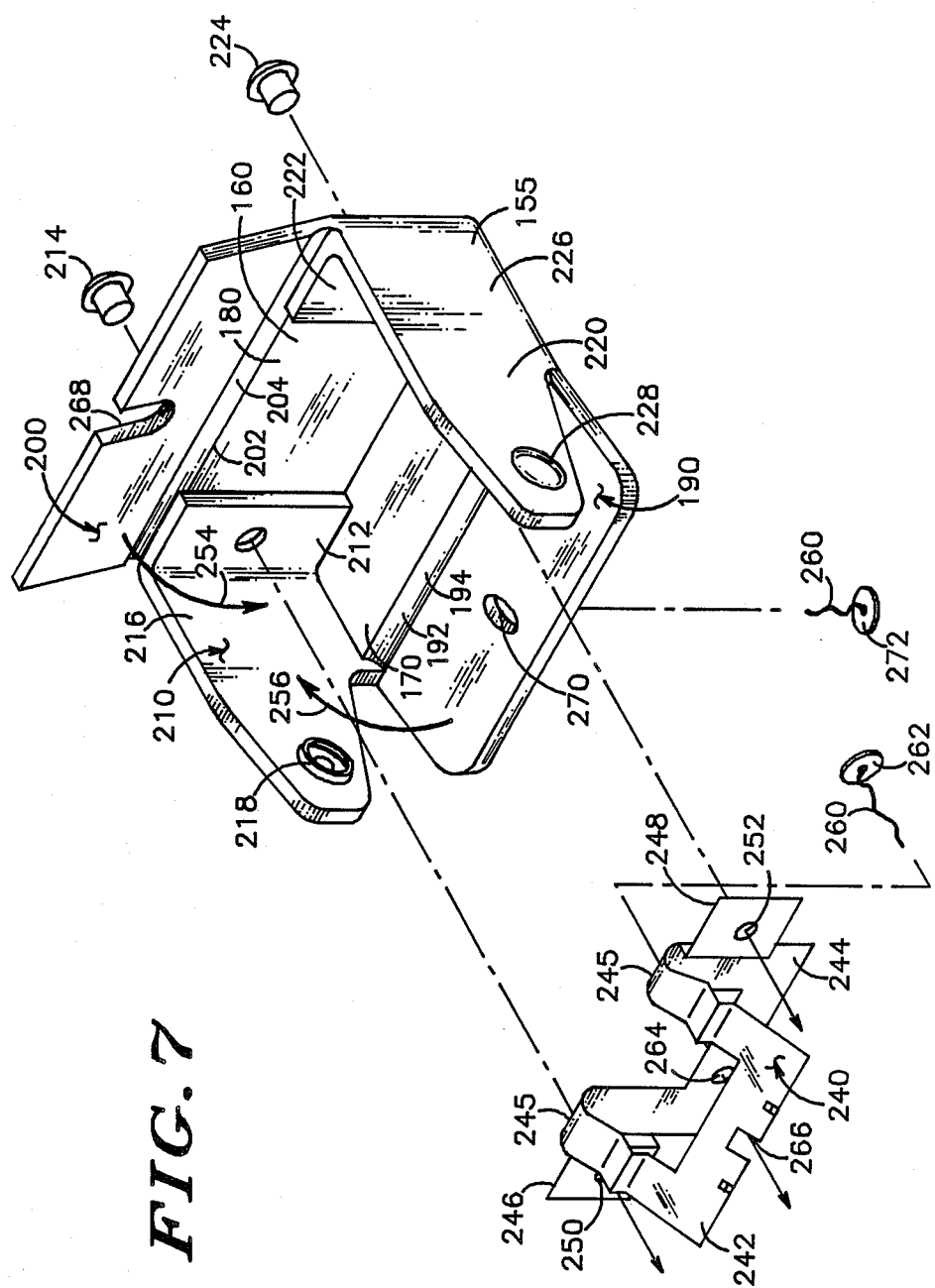
FIG. 7 is an exploded perspective of the deflector portion of another embodiment of the carrying case of the present invention.
Figure 8:
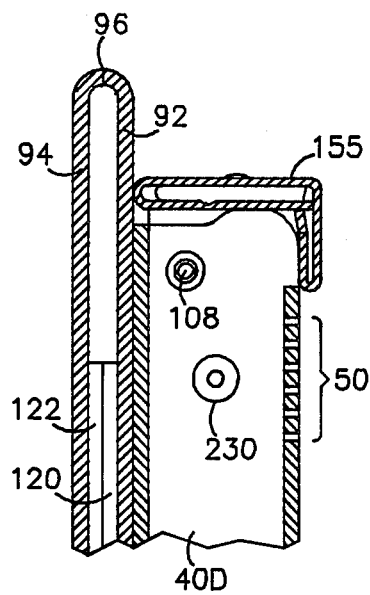
FIG. 8 is a cross sectional view of the embodiment of the invention of FIG. 7 showing the deflector in the open position.

FIG. 7 illustrates an exploded back view of deflector 155 which is used in place of deflector 55 in another embodiment of the invention. The resultant carrying case is substantially the same as the carrying case discussed above except for the substitution of deflector 155 for deflector 55. Deflector 155 includes an integral four part assembly 160 having a bottom panel 170 and a front panel 180 in L-shaped relationship with respect to each other. Bottom panel 170 and front panel 180 are formed from the same material and are folded to form the above mentioned L-shape as shown in FIG. 7 and FIG. 8. When carrying case 10 is used, bottom panel 170 and front panel 180 are in stationary relationship with respect to each other. Assembly 160 further includes lower panel 190 and upper panel 200. A fold line or partial cut in assembly 160 at line 192 forms a hinge 194 which permits lower panel 190 to move with respect to bottom panel 170. A fold line or partial cut in assembly 160 at line 202 forms a hinge 204 which permits upper panel 200 to move with respect to front panel 180.

Deflector 155 includes mounting arms 210 and 220 which are attached to the respective opposed ends of front panel 180 as shown in FIG. 7. More specifically, mounting arm 210 is substantially L-shaped and includes a base 212 which is attached to one end of front panel 180 by a rivet 214. Mounting arm 220 is substantially L-shaped and includes a base 222 which is attached to the remaining end of front panel 180 by a rivet 224. Mounting arms 210 and 220 include side surfaces 216 and 226 which form the acoustic side surfaces of deflector 155. Mounting arms 210 and 220 include pivot members 218 and 228, respectively, which attach to mating pivot members 230 and 232 (shown in FIG. 6). One type of structure which is employed as pivot members 218 and 228, and pivot members 230 and 232 are female and male button type snap fasteners as illustrated in FIG. 7 and FIG. 6.

Deflector 155 includes a V-shaped leaf spring 240 having leg members 242 and 244 and an apex 245 as shown in FIG. 7. Spring 240 includes mounting tabs 246 and 248 at the opposed lateral ends of leg member 244. Mounting tabs 246 and 248 includes holes 250 and 252, respectively, through which rivets 214 and 224 pass to hold spring leg member 244 adjacent to front panel 180.

Figure 9:
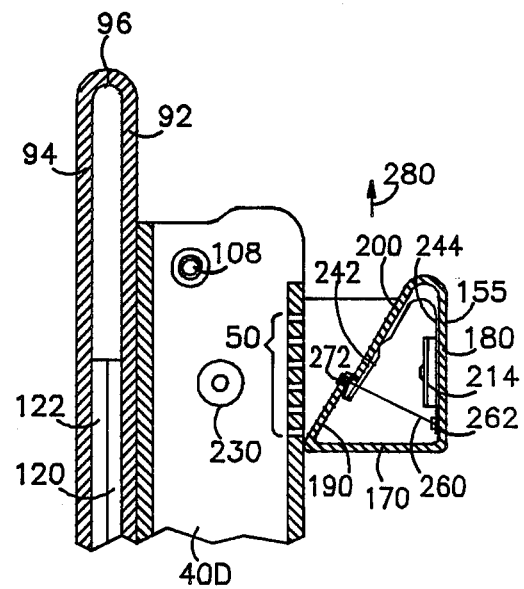
FIG. 9 is a cross sectional view of the embodiment of the invention of FIG. 7 showing the deflector in the closed position.

Upper panel 200 folds down over spring leg member 242 in the direction of arrow 254 as shown in FIG. 7 and more clearly in the cross section of carrying case 10 in FIG. 9. Lower panel 190 folds up over the end of spring leg member 242 and upper panel 200 in the direction of arrow 256 as seen in FIG. 7 and more clearly in FIG. 9. Returning again to FIG. 7, one end of a string 260 is attached to spring leg member 244 by an anchor 262 mounted in hole 264 of spring leg member 244. String 260 extends through a slot 266 in spring member 242 and a slot 268 in upper panel 200 and further through a feed through hole 270 in lower panel 190 at which the remaining end of string 260 is attached to lower panel 190 by an anchor 272. String 260 and its spatial relation to the other components of deflector 155 is shown more clearly in the cross section of FIG. 9.

The spring action of spring 240 forces upper panel 200 and lower panel 190 in a direction away from anchor 262. The distance which spring leg member 242, upper panel 200 and lower panel 190 can travel with respect to spring leg member 244 is limited by the length of string 260. That is, when deflector 155 is in the open position as in FIG. 9, the length of string 260 determines whether upper panel 200 and lower panel 190 form a straight angle (that is, are parallel) with respect to each other, or bow inward toward anchor 262, or bow outward toward anchor 272. The composite surface formed by upper panel 200 and lower panel 190 is responsible for deflecting most sound signals from openings 50 to a direction indicated by arrow 280. The length of string 260 is selected according to the shape of the composite surface desired. For most applications, it was found acceptable to have the shape of the composite surface be a straight angle, that is, the length of string 260 is selected to be a length $L_1$ such that when deflector 155 is in the open position, lower panel 190 and upper panel 200 form a substantially straight angle or are parallel with each other. If for another application, it is desired that the composite surface bow inward toward anchor 262, then the length of string 260 is selected to be less than $L_1$ by an amount corresponding to the amount of inward bow desired. If for yet another application, it is desired that the composite surface bow outward toward anchor 272, then the length of string 260 is selected to be greater than $L_1$ by an amount corresponding to the amount of outward bow desired.

FIG. 9 is a cross sectional view of carrying case 10 with deflector 155 in the closed position for protection of the controls of a radio to be situated therein. It is noted that when deflector 155 is moved from the open position of FIG. 8 to the closed position of FIG. 9, the composite surface formed by lower panel 190 and upper panel 200 collapses inward toward anchor 262. In such case, as the user closes deflector 155, lower panel 190 and upper panel 200 make contact with housing 40 and are pushed inward against the expansive force of spring 240 until deflector 155 is fully closed as in FIG. 9.

Figure 10:
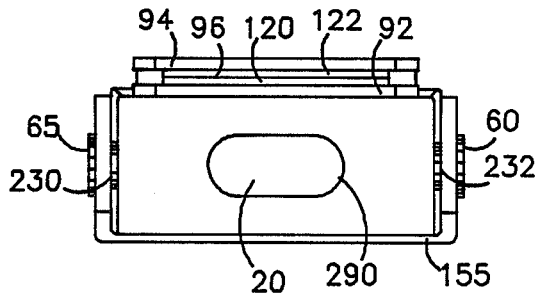
FIG. 10 is a view of the bottom of the carrying case of the present invention.

FIG. 10 shows a view of the bottom of carrying case 10 with portable radio 20 therein. The bottom surface 40F of case 10 includes an opening 290.

The foregoing describes a carrying case apparatus which permits a radio to be attached temporarily to the user for carrying purposes. The disclosed carrying case permits easy access to the controls of the radio and simultaneously permits the user, at his or her option, to channel the sound from the radio upward toward the user's ears for enhanced listening. The carrying case also provides the radio with protection from the environment.

While only certain preferred features of the invention have been shown by way of illustration, many modifications and changes will occur to those skilled in the art. It is, therefore, to be understood that the present claims are intended to cover all such modifications and changes which fall within the true spirit of the invention.

We claim:

1. A carrying case for a portable radio device exhibiting a generally rectangular cross section, said radio device being adapted to be worn on the body below the ear of a radio user, said radio device including a sound emitting portion from which sound signals are emitted, said carrying case comprising:

housing means for housing asid radio device, said housing means exhibiting a generally rectangular cross section and having upper and lower opposed ends, said lower end being closed and said upper end being open to receive said radio device therethrough, said housing means including a side surface having a sound transmitting portion situated such that when said radio device is placed in said carrying case said sound transmitting portion is adjacent the sound emitting portion of said radio device, such that the sound signals pass from the sound emitting portion of said radio device through said sound transmitting portion;

sound deflector means, rotatably attached to said housing means, being positionable in a first position to deflect sound signals passing through said sound transmitting portion of said housing means substantially upward toward the ear of the radio user, said sound deflector means being rotatable to a second position which covers the open upper end of said housing means to protect said radio device, and, attachment means, connected to said housing means, for attaching said carrying case to a radio user.

2. The carrying case of claim 1 wherein said sound transmitting portion includes a plurality of holes through which said sound signals travel.

3. The carrying case of claim 1 wherein said case is adapted to be worn on a user's belt and wherein said attachment means includes a flap having first and second flap portions, said first flap portion being mechanically connected to said housing means, said second flap portion being foldable over the user's belt and removably attachable to said first flap portion to hold said case to said belt.

* * * * *